United States Patent
Wang

(10) Patent No.: US 10,795,702 B2
(45) Date of Patent: Oct. 6, 2020

(54) METHOD FOR INSERTING VIRTUAL RESOURCE OBJECT IN APPLICATION, AND TERMINAL

(71) Applicant: TENCENT TECHNOLOGY (SHENZHEN) COMPANY LIMITED, Shenzhen (CN)

(72) Inventor: Yiran Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 32 days.

(21) Appl. No.: 16/355,706

(22) Filed: Mar. 16, 2019

(65) Prior Publication Data

US 2019/0213023 A1    Jul. 11, 2019

Related U.S. Application Data

(63) Continuation of application No. PCT/CN2017/111169, filed on Nov. 15, 2017.

(30) Foreign Application Priority Data

Dec. 6, 2016  (CN) .......................... 2016 1 1110502
Dec. 22, 2016  (CN) .......................... 2016 1 1202957

(51) Int. Cl.
*G06F 9/451* (2018.01)
*G06F 3/0481* (2013.01)
(Continued)

(52) U.S. Cl.
CPC .............. *G06F 9/453* (2018.02); *A63F 13/35* (2014.09); *A63F 13/52* (2014.09); *A63F 13/55* (2014.09);
(Continued)

(58) Field of Classification Search
USPC ............................................................. 463/7
See application file for complete search history.

(56) References Cited

U.S. PATENT DOCUMENTS 4,498,675 A * 2/1985 Jones .................. A63F 3/00006
273/249
2013/0296045 A1   11/2013 Dun et al.
(Continued)

FOREIGN PATENT DOCUMENTS

CN    103530040    1/2014
CN    104750416    7/2015
(Continued)

OTHER PUBLICATIONS

Dota Xinshou-Place Wards Detailed Tutorial, PC games, Jun. 23, 2009, Text, p. 1. https://fight.pcgames.com.on/warcraft/dota/xinshou/0906/1492981.html.

(Continued)

*Primary Examiner* — Pierre E Elisca
(74) *Attorney, Agent, or Firm* — Oblon, McClelland, Maier & Neustadt, L.L.P.

(57) ABSTRACT

Aspects of the disclosure provide a method and a terminal device for providing an application interface. Processing circuitry executes an application program that provides a graphical interface on a display device. The processing circuitry obtains a present location of a graphical symbol in the graphical interface. The graphical symbol is indicative of a placement of a resource for use at a specific area in the graphical interface. Then, the processing circuitry determines whether the present location of the graphical symbol satisfies a preset condition, and determines a target location when the present location satisfies the preset condition. Then, the network interface circuitry sends a request message to a server device. When the terminal device receives an approval message, the terminal device updates the graphi- (Continued)

cal interface with a graphical icon of the resource being positioned at the target location.

20 Claims, 12 Drawing Sheets

(51) Int. Cl.
*G06F 3/0484* (2013.01)
*G06F 16/23* (2019.01)
*A63F 13/55* (2014.01)
*A63F 13/52* (2014.01)
*A63F 13/35* (2014.01)
*G06F 16/487* (2019.01)
*H04J 3/06* (2006.01)
*A63F 13/2145* (2014.01)

(52) U.S. Cl.
CPC ........ *G06F 3/0484* (2013.01); *G06F 3/04817* (2013.01); *G06F 16/2365* (2019.01); *G06F 16/487* (2019.01); *A63F 13/2145* (2014.09); *A63F 2300/1075* (2013.01); *A63F 2300/535* (2013.01); *H04J 3/0676* (2013.01)

(56) References Cited

U.S. PATENT DOCUMENTS

| 2014/0223366 A1 | 8/2014 | Sato |
| 2014/0357356 A1 | 12/2014 | Horie |
| 2014/0357365 A1* | 12/2014 | Kruglick ................ A63F 13/65 463/31 |

FOREIGN PATENT DOCUMENTS

| CN | 104881230 | 9/2015 |
| CN | 105094345 | 11/2015 |
| CN | 105214309 | 1/2016 |
| CN | 105653085 | 6/2016 |
| CN | 105892874 | 8/2016 |
| CN | 105912185 | 8/2016 |
| CN | 106126077 | 11/2016 |
| CN | 106582018 | 4/2017 |
| CN | 106598433 | 4/2017 |

OTHER PUBLICATIONS

Benshouji, Game planner's sharing about fog mode of Arena of Valor, Apr. 25, 2016, Text, p. 1-4, https://www.toutiao.com/I62772908023_13970176/.
Arena of Valor team [Game Planner's Sharing] A talk about the fog mode (fog, warding, and antiwarding), Text, p. 1-5, http://pvp.qq.com/webplat/info/news_version3/15592/240_91/24092/24095/m15241/201604/455507.shtml.
The official Website; [Game Planner's Sharing] A talk about the fog mode (fog, warding, and antiwarding), Text, p. 1-5 http://pvp.17173.com/content/05102016/194225365.shtml.
Office Action dated Sep. 26, 2018 in Chinese Patent Application No. 201611110502.5 (with Concise English Translation).
Office Action dated Jul. 2, 2018 in Chinese Patent Application No. 201611110502.5 (with Concise English Translation).
Office Action dated Apr. 8, 2018 in Chinese Patent Application No. 201611110502.5 (with Concise English Translation).
Office Action dated Jan. 16, 2019 in Chinese Patent Application No. 201611202957.X (with Concise English Translation).
Office Action dated Oct. 15, 2018 in Chinese Patent Application No. 201611202957.X (with Concise English Translation).
Office Action dated Jul. 3, 2018 in Chinese Patent Application No. 201611202957.X (with Concise English Translation).
Office Action dated Apr. 13, 2018 in Chinese Patent Application No. 201611202957.X (with Concise English Translation).
International Search Report dated Feb. 13, 2018 in PCT/CN2017/11169 filed Nov. 15, 2017. (With English Translation).
Written Opinion dated Feb. 13, 2018 in PCT/CN2017/11169 filed Nov. 15, 2017.

* cited by examiner

METHOD FOR INSERTING VIRTUAL RESOURCE OBJECT IN APPLICATION, AND TERMINAL

RELATED APPLICATION

This application is a continuation of International Application No. PCT/CN2017/111169, filed on Nov. 15, 2017, which claims priority to Chinese Patent Application No. 201611110502.5 filed with the Chinese Patent Office on Dec. 6, 2016 and entitled "METHOD FOR INSERTING VIRTUAL RESOURCE OBJECT IN APPLICATION AND TERMINAL", and to Chinese Patent Application No. 201611202957.X filed with the Chinese Patent Office on Dec. 22, 2016 and entitled "METHOD FOR INSERTING VIRTUAL RESOURCE OBJECT IN APPLICATION AND TERMINAL". The entire disclosures of the prior applications are incorporated by reference herein in their entirety.

FIELD OF THE TECHNOLOGY

This application relates to the computer field, and in particular, to a method for inserting a virtual resource object in an application and a terminal.

BACKGROUND OF THE DISCLOSURE

With the development of science and technology, mobile phones now have more functions and functions are more powerful. Particularly, mobile games are much more than those people think of such as "Tezus" and "Snake" with simple and crude images and rules, and developed in complex forms to be comparable to handheld game consoles and have strong entertainment and interactivity. For example, multiplayer online battle arena (MOBA) games are developed.

In current mobile MOBA games, operations are usually performed by moving a skill button. For example, when a virtual resource object (usually referred to as a ward in games) for monitoring a field of view is to be inserted at a fixed point in a game, a user needs to precisely operate so that the ward can be accurately inserted in a to-be-monitored field of view (bush or other areas in the game). However, due to insufficient precision in the user's operation of moving a skill button during battling in the game, the to-be-inserted virtual resource object is often inserted in a wrong place. Consequently, the virtual resource object cannot fully function as expected, and user experience is affected.

SUMMARY

Embodiments of this application provide a method for inserting a virtual resource object in an application and a terminal, to help a user accurately insert a virtual resource object, and improve user experience.

Aspects of the disclosure provide a method and a terminal device for providing an application interface. In an example, the terminal device includes network interface circuitry, a display device and processing circuitry. The network interface circuitry communicates with a server device via a network. The display device displays a graphical interface. The processing circuitry executes an application program that provides the graphical interface on the display device. The processing circuitry obtains a present location of a graphical symbol in the graphical interface. The graphical symbol is indicative of a placement of a resource for use at a specific area in the graphical interface. Then, the processing circuitry determines whether the present location of the graphical symbol satisfies a preset condition for the placement of the resource in the specific area, and determines a target location in the specific area for disposing the resource when the present location satisfies the preset condition. Then, the network interface circuitry sends a request message that includes the target location to the server device. The server device performs a consistency check. When the target location passes the consistency check, the server device sends an approval message that includes the target location to the terminal device. The terminal device receives the approval message and updates the graphical interface with a graphical icon of the resource being positioned at the target location.

In some embodiments, when the present location satisfies the preset condition, the processing circuitry changes a color of the graphical symbol to indicate that the resource is allowed to be placed in the specific area.

In an example, the processing circuitry determines whether the present location of the graphical symbol is within a boundary of a pre-determined area that covers the specific area. In an example, the boundary of the predetermined area is enlarged from an edge of the specific area by a preset distance.

In some embodiments, the processing circuitry determines the target location according to a mapping relationship between first positions in the pre-determined area and second positions in the specific area. For example, the processing circuitry selects one of the second positions in the specific area with a shortest distance to the present location as the target location.

In some embodiments, when the target location is determined, the processing circuitry adjusts the graphical symbol with a graphical appearance corresponding to characteristics of the target location. In some example, the terminal device receives, via a user interface device, a user instruction for inserting the resource at the target location.

According to some embodiments, the terminal device is configured to, in response to the user instruction, send, via the network interface circuitry, a synchronization frame to the server device to request the sever device to synchronize multiple terminal devices that participate the application. The server device broadcasts the synchronization frame to the multiple terminal devices, and receives test reports from the multiple terminal devices. Based on the test reports, the server device sends an approval message to the terminal device.

Aspects of the disclosure also provide a non-transitory computer-readable medium storing instructions which when executed by a computer cause the computer to perform the method for providing a graphical interface.

It can be seen from the foregoing technical solutions that the embodiments of this application have the following advantages: The terminal determines, based on the preset condition and the current location of the virtual resource object on the operation interface of the application scene, the information about the target location in which the virtual resource object is to be inserted, and then sends the target location information to the server. After the server determines that the target location information passes consistency check, the terminal receives the target location information, and inserts the virtual resource object in the location indicated by the target location information, instead of directly inserting the virtual resource object in the current location.

Therefore, a user can insert a virtual resource object more accurately, and user experience is improved.

BRIEF DESCRIPTION OF THE DRAWINGS

To describe the technical solutions of the embodiments of the present disclosure more clearly, the accompanying drawings for illustrating the embodiments are described briefly in the following. The drawings in the following description are some embodiments of the present disclosure, and a person skilled in the art may obtain other drawings on the basis of these accompanying drawings.

DESCRIPTION OF EMBODIMENTS

Embodiments of this application provide a method for inserting a virtual resource object in an application and a terminal, to help a user accurately insert a virtual resource object, and improve user experience.

In the specification, claims, and accompanying drawings of this application, the terms "first", "second", "third", "fourth", and so on (if existent) are intended to distinguish between similar objects but do not necessarily indicate a specific order or sequence. It is understood that the data termed in such a way are interchangeable in proper circumstances so that the embodiments of the present disclosure described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, system, product, or device.

Before the embodiments of the present disclosure are described, terms involved in the embodiments of the present disclosure are described first:

The term "indicator" is a special effect, a halo, or an operation for assisting skill release in a game application scene.

The term "virtual resource object" is a tool for monitoring a field of view, also referred to as a ward in a game application scene. As a field-of-view tool provided by an own camp, it needs to be used through wheel casting. As for wheel casting, a normal attack button is transformed into a wheel, which may rotate in a plurality of directions, to help a player with more precise skill release.

The term "warding" is a behavior of inserting a "ward" in a fixed location.

The term "bush" is a special scene object in a game, where a player-controlled character can be hidden, and a field of view outside the bush is visible to a player in the bush, but a field of view in the bush is invisible to an enemy camp. A character in an enemy camp is visible only after a character in an own camp or an own ward is in the bush.

The term "obstacle" is a scene object that a character cannot directly pass through in a game.

The term "normal ground" is a scene object in a game, in particular, a scene object other than the bush and obstacle in the game, which is, for example, a road, a sea, or a beach.

Figure 1:
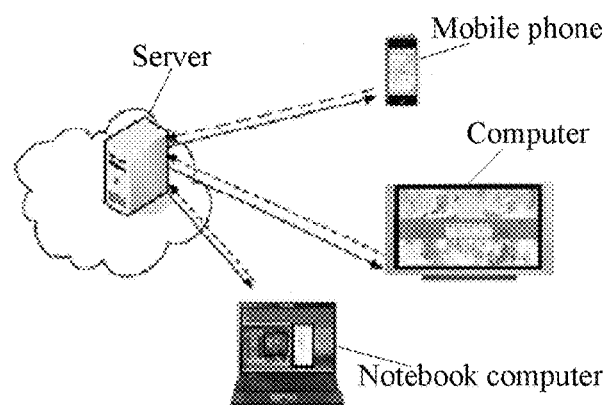
FIG. 1 is a schematic structural diagram of a system framework according to an embodiment of the present disclosure.

The following describes a system framework involved in the embodiments of the present disclosure. As shown in FIG. 1, the system framework includes a server and a terminal, and a communication connection is established between the server and the terminal. One server may be connected to a plurality of terminals. The terminal may include any terminal device such as a mobile phone, a notebook computer, a computer, a personal digital assistant (PDA), an in-vehicle computer, which is not specifically limited herein. An operating system of the terminal may be a Windows operating system, a Unix operating system, a Linux operating system, a Mac operating system, or the like, which is not specifically limited herein.

The server receives a synchronization frame corresponding to an insertion instruction sent by a target terminal, and sends the synchronization frame to each terminal corresponding to a target game application, so that each terminal checks running data or an operation behavior on the terminal, to avoid a plug-in or a repeated operation. The target terminal executes a command corresponding to the synchronization frame, that is, inserts a virtual resource object in a location area indicated by an indicator, only after the check of each terminal is passed. In the embodiments of the present disclosure, the game application is generally a MOBA game application, for example, Strike of Kings or League of Legends. Using Strike of Kings as an example, which is played on a plurality of terminals at the same time, when a ward is inserted in a scene object such as normal ground, bush, and obstacles, combat skills can be effectively improved. A warding location is indicated by using an indicator, so that warding precision is effectively improved, and a warding error rate is reduced.

It is understood that the technical solutions provided in this application are applicable to a warding scene when a user plays a MOBA game on a terminal, as well as to other scenes, for example, a scene where a virtual resource object needs to be moved precisely when the user plays chess on the terminal or when a rule in a game played by the user on the terminal is that who inserting the flag wins. Specific situations are not limited herein.

Figure 2:
FIG. 2 is a schematic diagram of a scene where a virtual resource object is inserted in an application according to an embodiment of this application.
Figure 3:
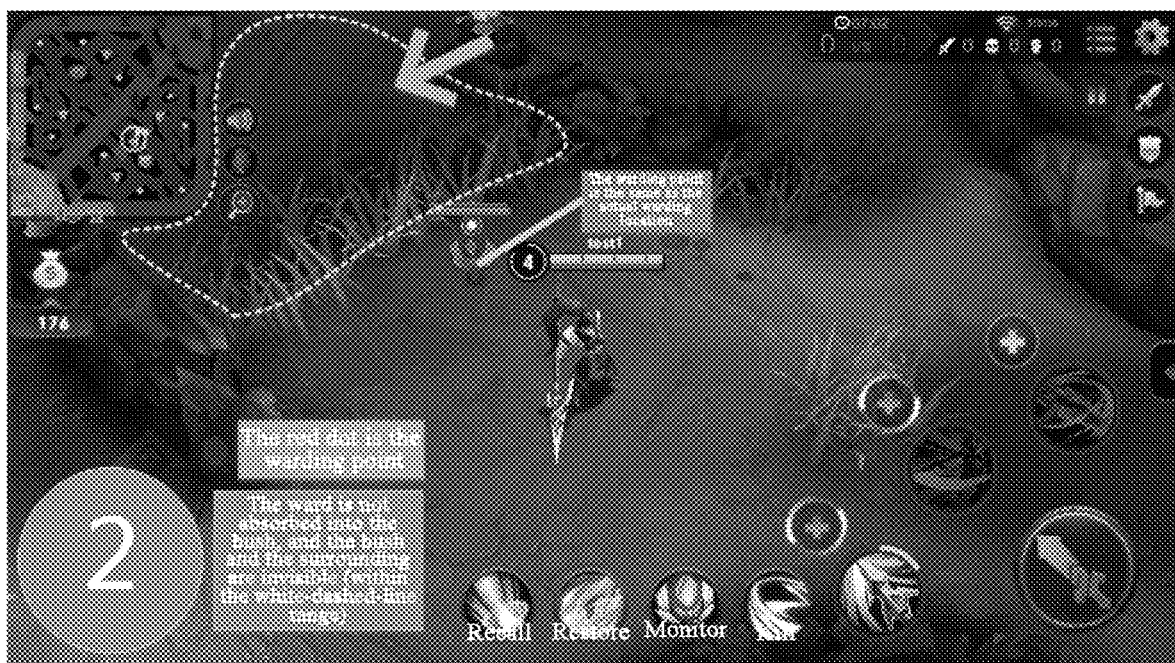
FIG. 3 is a schematic diagram of a scene after a virtual resource object is inserted in an application according to an embodiment of this application.

In the embodiments of this application, when a user operates an application on a terminal, a plurality of scenes (e.g., graphical interfaces) where a virtual resource object needs to be moved precisely may occur. For example, when the user plays a MOBA game on the terminal, a special invisible area such as bush usually appears in a game scene. The user needs to obtain a field of view in the bush to better guard against an attack from the enemy. In this case, the user may release a warding skill (that is, release a monitoring skill) in the game. To be specific, the user needs to move and insert a skill indicator representing a ward in the bush, and then the bush is in a visible state to the user. However, in current operation scenes, the terminal usually inserts the ward where the user moves the ward. As shown in FIG. 2, if the user moves the ward near the bush rather than in the bush, that is, at a dot shown in FIG. 2, the terminal inserts the ward in a location of the dot, as shown in FIG. 3. In this case, because the terminal does not insert the ward in a field-of-view area (a dashed-line area in FIG. 3) of the bush, the field-of-view area of the bush is invisible.

To resolve the problem, the embodiments of this application propose the following solution: A terminal obtains a current location of a virtual resource object on an operation interface of an application scene. The terminal determines information about a target location in which the virtual resource object is to be inserted when the current location satisfies a preset condition. The terminal sends the target location information to a server. The terminal receives the target location information sent by the server, the target location information being sent by the server after the server determines that the target location information passes consistency check. The terminal inserts the virtual resource object in the location indicated by the target location information.

Figure 4:
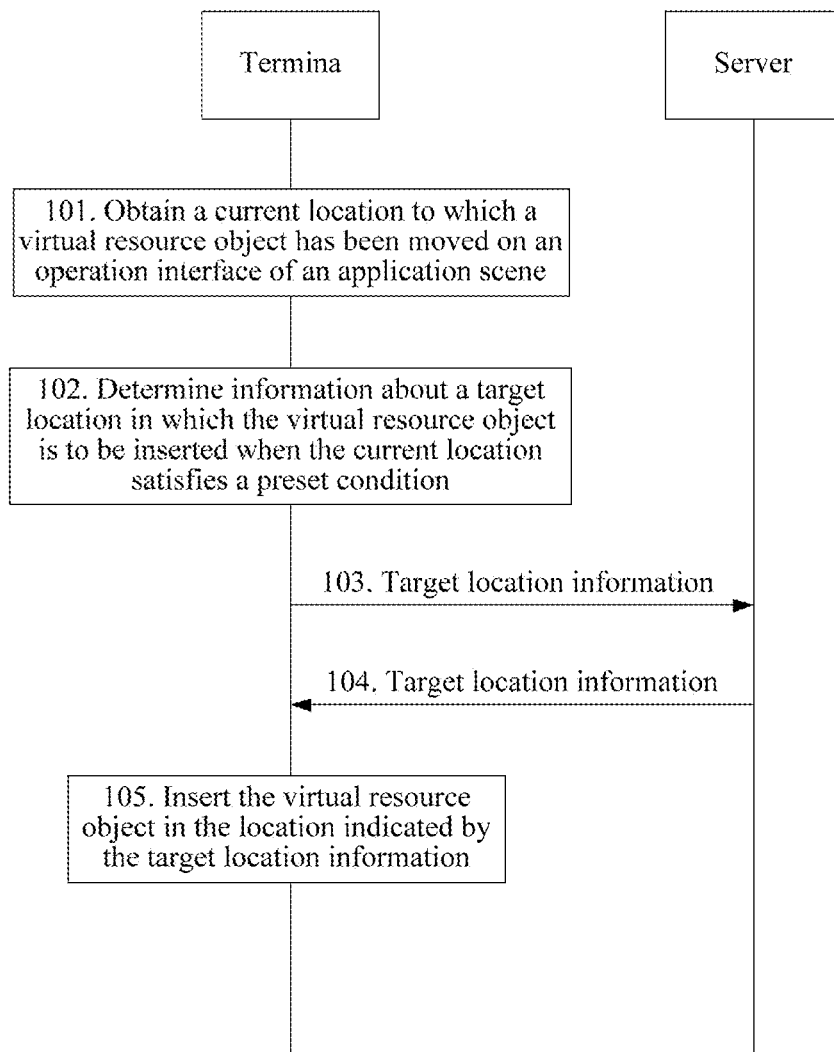
FIG. 4 is a schematic diagram of an embodiment of a method for inserting a virtual resource object in an application according to the embodiments of this application.

Specifically, referring to FIG. 4, an embodiment of the method for inserting a virtual resource object in an application provided in the embodiments of this application includes the following steps:

101. A terminal obtains a current location to which a virtual resource object has been moved on an operation interface of an application scene.

The terminal obtains information about movement of the virtual resource object on the operation interface of the current application scene. When the terminal detects that the virtual resource object stops moving, the terminal obtains the current location at which the virtual resource object stops on the application scene of the current operation interface.

During actual application, the terminal includes, but is not limited to, a mobile phone, a tablet computer, and the like. When the terminal is the mobile phone or the tablet computer, the terminal may perform the operation by using a touchscreen of the mobile phone or the tablet computer. The touchscreen herein is also referred to as a "touch panel", which is an inductive liquid crystal display apparatus that can receive signals input by a contact and the like. When a graphical button on the screen is touched, a tactile feedback system on the screen can drive various connected apparatuses by using a pre-programmed program, which can be used to replace a mechanical button layout and create vivid audio and video effects with a liquid crystal display screen. The terminal obtains information about movement of the virtual resource object made by a finger of a user, and determines location information of the virtual resource object. Certainly, when the terminal is operated by using a mouse, the terminal obtains information about movement of the virtual resource object made by the mouse of the user, and determines location information of the virtual resource object.

102. The terminal determines information about a target location in which the virtual resource object is to be inserted when the current location satisfies a preset condition.

After the terminal obtains the current location, the terminal determines whether the current location satisfies the preset condition. If yes, the terminal may obtain, from a mapping relationship between the current location and the location indicated by the information about the target location in which the virtual resource object is to be inserted, the information about the target location in which the virtual resource object is to be inserted. The mapping relationship is preset. A specific situation is not limited herein.

During actual application, after the terminal determines that the current location satisfies the preset condition, the terminal may further change a color of an indicator corresponding to the virtual resource object to a target color used to indicate that the virtual resource object is allowed to be inserted.

103. The terminal sends the target location information to a server.

After the terminal determines the target location information, the terminal sends a frame synchronization command to the server. The frame synchronization command carries the target location information.

104. The server sends the target location information to the terminal if the target location information passes consistency check.

After receiving the frame synchronization command sent by the terminal, the server parses the frame synchronization command to obtain the target location information, and performs consistency check on the target location information. If the target location information can pass consistency check, the server sends the target location information to the terminal. Therefore, it may be understood that after receiving the target location information, the server first performs consistency check, and then returns the target location information passing consistency check to the terminal.

During actual application, after the server determines that the target location information passes consistency check, the server distributes the target location information to all terminals related to the application scene, so that all the terminals update the application scene based on the target location information.

105. The terminal inserts the virtual resource object in the location indicated by the target location information.

After the terminal receives the target location information, the terminal inserts the virtual resource object in the location indicated by the target location information.

During actual application, the terminal further needs to display an application scene updated after the virtual resource object is inserted. Certainly, when determining the target location information, the terminal may pre-display the application scene updated after the virtual resource object is inserted, which is optional, and a specific operation process is not limited herein.

In this embodiment of this application, the terminal determines, based on the preset condition and the current location of the virtual resource object on the operation interface of the application scene, the information about the target location in which the virtual resource object is to be inserted, and then sends the target location information to the server. After the server determines that the target location information passes consistency check, the terminal receives the target location information, and inserts the virtual resource object in the location indicated by the target location information, instead of directly inserting the virtual resource object in the current location. Therefore, a user can insert a virtual resource object more accurately, and user experience is improved.

Figure 5:
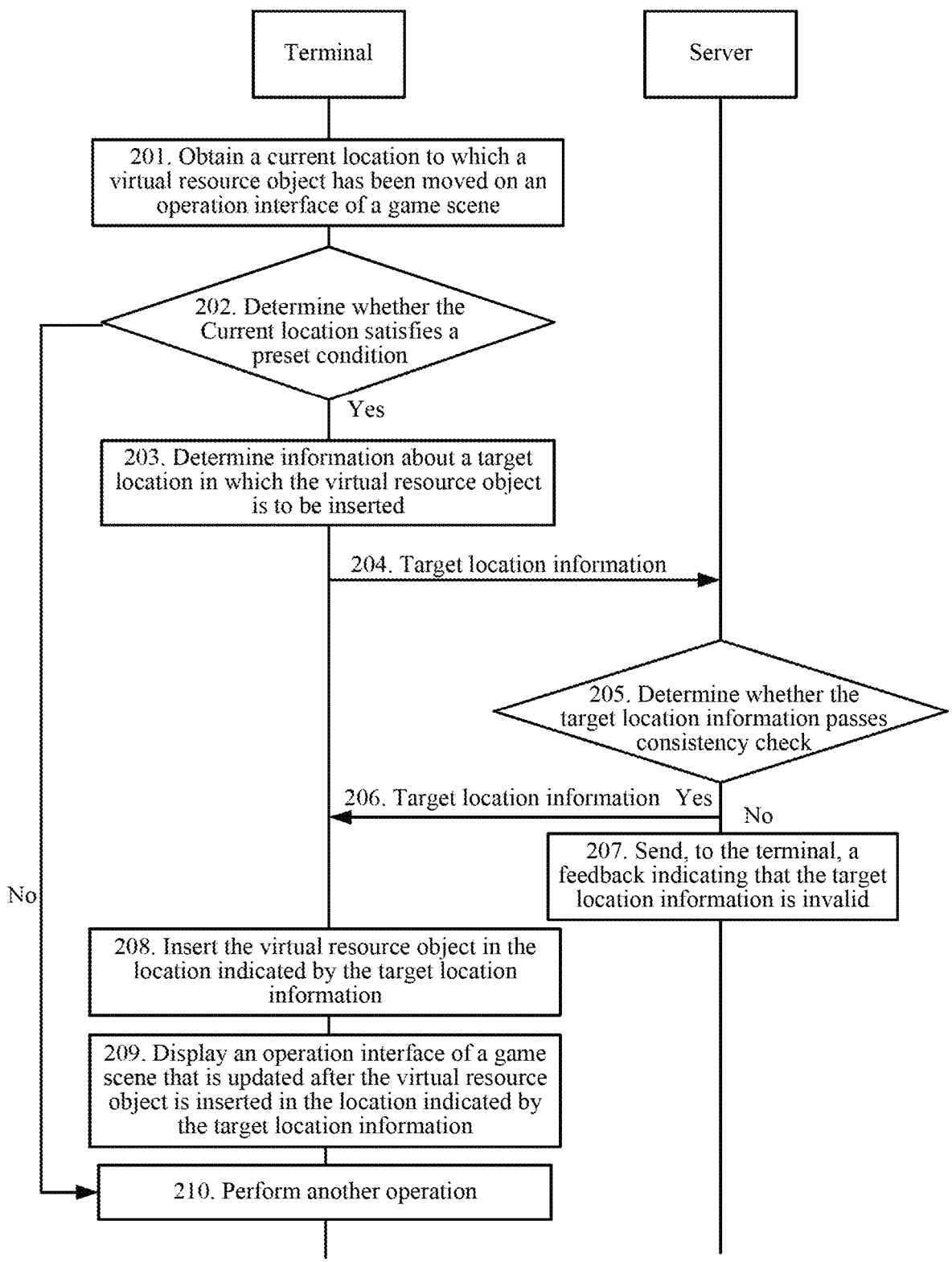
FIG. 5 is a schematic diagram of another embodiment of the method for inserting a virtual resource object in an application according to the embodiments of this application.

To facilitate understanding, the following provides a description by using an example in which a virtual resource object used to monitor a field of view is inserted in an operation interface of a game scene:

Specifically, referring to FIG. 5, another embodiment of the method for inserting a virtual resource object in an application in the embodiments of this application includes the following steps:

201. A terminal obtains a current location to which a virtual resource object has been moved on an operation interface of a game scene.

In the operation interface of the current game scene, the terminal may move a skill indicator representing the virtual resource object. When the terminal determines that the skill indicator does not move any more, that is, the virtual resource object does not move any more, the terminal obtains the current location of the virtual resource object.

Figure 6:
FIG. 6 is a schematic diagram of moving a virtual resource object according to an embodiment of this application.

In this embodiment of this application, the operation interface of the game scene may be an operation interface in a mobile game, and in this case, a to-be-monitored field of view, for example, bush shown in FIG. 2, may appear. In this case, the virtual resource object may be a virtual resource object for monitoring a field of view, that is, "monitor" shown in FIG. 2 is also referred to as a "ward". During actual application, a user may operate a skill indicator representing the ward to move to the bush, as shown in FIG. 6. When the movement stops, the skill indicator also stops, and in this case, a location at which the skill indicator stops is a current location of the ward.

202. The terminal determines whether the current location satisfies a preset condition. If yes, step 203 and step 204 are performed. If not, step 210 is performed.

After the terminal obtains the current location of the virtual resource object, the terminal determines whether the current location is in the to-be-monitored field of view or whether the current location is in a preset determining box. If the terminal determines that the current location is in the to-be-monitored field of view or the current location is in the preset determining box, the terminal determines that the current location satisfies the preset condition, and the terminal performs step 203 and step 204. If the terminal determines that the current location is not in the to-be-monitored field of view and the current location is not in the preset determining box, the terminal determines that the current location does not satisfy the preset condition, and the terminal performs step 210.

Figure 7:
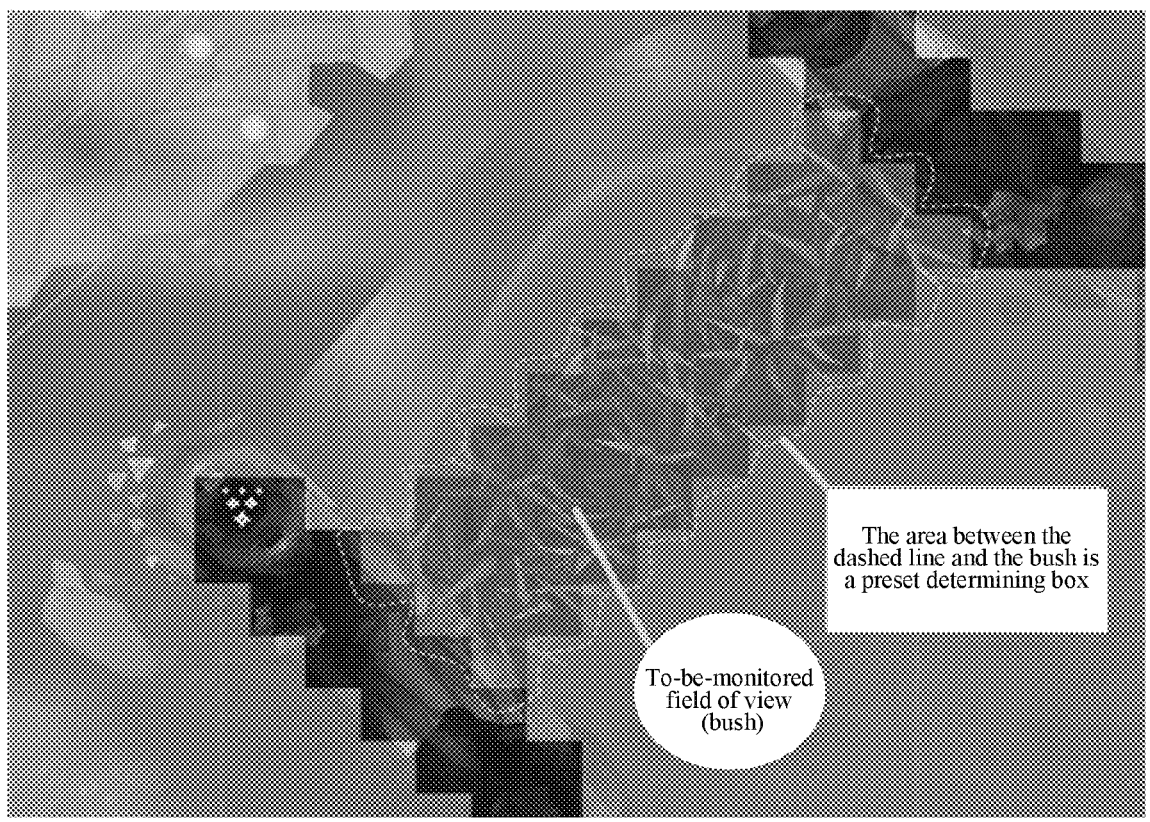
FIG. 7 is a schematic perspective diagram of a preset determining box according to an embodiment of this application.

In this embodiment of this application, the preset determining box is an area with a preset distance to an edge of the to-be-monitored field of view. For example, as shown in FIG. 7, an area between a dashed line and the to-be-monitored field of view (bush) is the preset determining box. FIG. 7 shows only a possibility. During actual application, the preset distance of the preset determining box may be set by the terminal, and a specific value is not limited herein.

203. The terminal determines information about a target location in which the virtual resource object is to be inserted.

After determining that the current location satisfies the preset condition, the terminal determines, from a preset mapping relationship between the current location and the target location for insertion, the information about the target location in which the virtual resource object is to be inserted.

In this embodiment of this application, the mapping relationship may be that the target location is a location whose straight-line distance to the current location is the shortest; or the mapping relationship may be that the target location is any location in the to-be-monitored field of view. The mapping relationships provided in this embodiment of this application as examples are only some possibilities. A specific mapping relationship is not limited herein, provided that the target location can be accurately determined.

204. The terminal sends the target location information to a server.

After the terminal determines the target location information, the terminal adds the target location information to a frame synchronization command, and then sends the frame synchronization command to the server.

205. The server determines whether the target location information passes consistency check. If yes, step 206 is performed. If no, step 207 is performed.

After the server receives the target location information sent by the terminal, the server performs consistency check on the target location information. If the server determines that the target location information passes the consistency check, the server performs step 206. If the server determines that the server determines the target location information fails to pass the consistency check, the server performs step 207.

During actual application, consistency check of the server is mainly checking various data of the terminal and a behavior of the terminal in a plurality of dimensions, to determine whether the target location information conforms to a normal use situation.

206. The server sends the target location information to the terminal.

After the server determines that the target location information is valid, the server sends the target location information to the terminal.

During actual application, a game scene usually includes an own party and an enemy party, and the numbers of members in the own party and the enemy party are not limited. When the terminal releases a skill, the skill needs to be displayed to the own party and the enemy party. In this case, when the server determines that the information about the target location in which the virtual resource object of the terminal is to be inserted is valid, the server sends the target location information to all terminals in the game scene for game synchronization.

207. The server sends, to the terminal, a feedback indicating that the target location information is invalid.

If the server determines that the target location information fails to pass consistency check, the server determines that the target location information is invalid, and then feeds back, to the terminal, a message indicating that the target location information is invalid, so that the terminal notifies that the skill cannot be released.

208. The terminal inserts the virtual resource object in the location indicated by the target location information.

After the terminal receives the target location information sent by the server, the terminal inserts the virtual resource object in the location indicated by the target location information.

209. The terminal displays an operation interface of a game scene that is updated after the virtual resource object is inserted in the location indicated by the target location information.

After the terminal inserts the virtual resource object in the location indicated by the target location information, the virtual resource object performs a corresponding function, so that the operation interface of the game scene is updated to an operation interface of a new game scene. The terminal displays the operation interface of the new game scene.

During actual application, the terminal pre-displays the operation interface of the new game scene when determining the target location information. Then, if the server determines that the target location information is valid, the terminal keeps pre-displaying the operation interface of the new game scene. If the server determines that the target location information is invalid, the terminal switches the pre-displayed operation interface of the new game scene to the operation interface of the game scene before the virtual resource object is inserted or to an operation interface of a game scene after the terminal inserts the virtual resource object in the current location. Specific situations are not limited herein.

210. The terminal performs another operation.

If the terminal determines that the current location of the virtual resource object does not satisfy the preset condition, the terminal may determine that the current location is invalid. That is, the terminal determines that the skill cannot be released at the current location; or the terminal directly inserts the virtual resource object in the current location.

In this embodiment of this application, if the location of the dot is not in the preset determining box, as shown in FIG. 2, the terminal may directly insert the ward in the location of the dot shown in FIG. 2, as shown in FIG. 3; or may directly determine that the ward cannot be inserted, and notify that skill release fails.

Figure 8:
FIG. 8 is a schematic diagram of a virtual resource object insertion process according to an embodiment of this application.

To facilitate understanding, this embodiment of this application is described by using several specific scenes as follows:

A user A is playing a team battle game on a mobile phone during leisure time, in which there are four partners in the same camp as the user A and there are five members in an enemy camp. In a process of playing the game, the user A walks near bush (in this game scene, the bush is an invisible area), and due to fear of being ambushed by the enemy in the bush, the user A wants to release a monitoring skill (commonly referred as a ward) in an operation interface of the game to clearly see the situation in the bush. The user A presses a skill indicator representing the monitoring skill with a finger so that the skill indicator representing the monitoring skill can move on the operation interface of the game scene along with movement of the finger, as shown in FIG. 6. After the user A presses the skill indicator representing the monitoring skill, a current color such as blue (represented by a thick-line circle in FIG. 8) is generated around the skill indicator, to indicate that the skill is in a to-be-released state. When the user A moves the skill indicator representing the monitoring skill near the bush, the user A stops the movement of the finger (that is, the skill indicator representing the monitoring skill also stops moving). A current stop location is a dot shown in FIG. 8. In this case, the color around the skill indicator is changed to green (represented by a thin-line circle in FIG. 8), to notify the user that the ward can be inserted herein. However, the dot shown in FIG. 8 is actually not in the bush but in a preset determining box, after the user inserts the ward at the dot, the operation interface of the game scene is displayed as shown in FIG. 8, where the ward is inserted in the bush (that is, an actual warding location in FIG. 8). In this case, a dashed-line part in FIG. 8 is visible to the user A.

Figure 9:
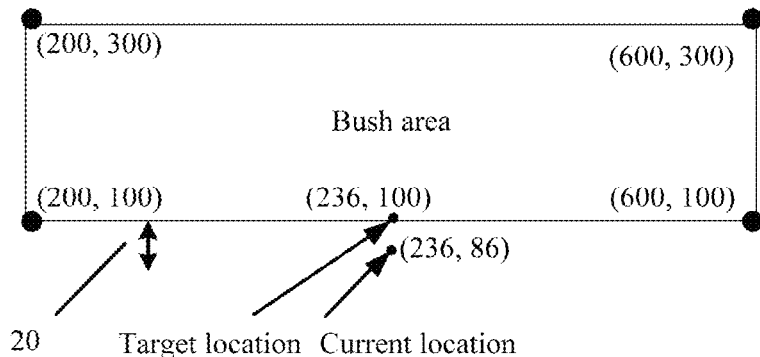
FIG. 9 is a schematic diagram of a preset determining box according to an embodiment of this application.

The foregoing description is made from the operation interface of the game scene. In a data processing process, if the bush area in the operation interface is a rectangular area bounded by fours coordinate points (200, 100), (600, 100), (200, 300), and (600, 300), as shown in FIG. 9, and the preset determining area is an area between the dashed line shown in FIG. 8 and the bush area, where a distance between dashed line and the bush is 20, when the user A moves the skill indicator of the ward to a dot shown in FIG. 9, the current location collected by the mobile phone used by the user A is (236, 86). The mobile phone may determine that the skill indicator representing the ward is in the preset determining box, and then the mobile phone may select, from a mapping relationship, a target location in which the mobile phone is to insert the ward. Because the mapping relationship may differ, the target location selected by the mobile phone may also differ. For example, if the mapping relationship is that the mobile phone selects a location that is in the bush area and is the closest to the current location as a target location, the mobile phone selects a target location (236, 100). If the mapping relationship is that the mobile phone selects any location in the bush area as a target location, the mobile phone may select a target location (236, 158) or (256, 254). A specific manner is not limited herein, provided that it can be ensured that the ward can implement a function after being inserted. In this embodiment of this application, for example, the target location is (236, 100). Then the mobile phone sends information about the target location to a server. The server determines, by analyzing behaviors and data of the user A, that the target location is valid data, and sends the target location to the mobile phone of the user A and mobile phones of the other nine users in the same game as the user A, so that operations in the same game scene are displayed synchronously.

Certainly, this embodiment of this application is not limited to the current game scene, and may also be applied to other game scenes or applications. For example, when a user plays a chess game, a chess piece may be moved in the foregoing manner. Specific scenes are not limited herein.

In this embodiment of this application, the terminal determines, based on the preset condition and the current location of the virtual resource object on the operation interface of the game scene, the information about the target location in which the virtual resource object is to be inserted, and then sends the target location information to the server. After the server determines that the target location information passes consistency check, the terminal receives the target location information, and inserts the virtual resource object in the location indicated by the target location information, instead of directly inserting the virtual resource object in the current location. Therefore, a user can insert a virtual resource object more accurately, and user experience is improved.

Optionally, based on the embodiments described above, referring to FIG. 10, FIG. 10 is a schematic diagram of another embodiment of the method for inserting a virtual resource object in an application according to the embodiments of the present disclosure. The application is generally a game application, and certainly, may be other study applications, livelihood applications, and the like, which is not specifically limited herein. A specific procedure of this embodiment includes the following steps:

301. Obtain a current location to which a virtual resource object has been moved on an operation interface of an application scene.

A terminal obtains information about movement of the virtual resource object on the operation interface of the current application scene. When the terminal detects that the virtual resource object stops moving, the terminal obtains the current location at which the virtual resource object stops on the application scene of the current operation interface.

302. Determine information about a target location in which the virtual resource object is to be inserted when the current location satisfies a preset condition.

After the terminal obtains the current location, the terminal determines whether the current location satisfies the preset condition. If yes, the terminal may obtain, from a mapping relationship between the current location and the location indicated by the information about the target location in which the virtual resource object is to be inserted, the information about the target location in which the virtual resource object is to be inserted. The mapping relationship is preset. A specific situation is not limited herein.

The target location information is information about a location in a target application scene. The target application scene is generally a game scene, for example, a game scene of a MOBA game such as Strike of Kings or League of Legends. The game scene includes a plurality of scene objects, that is, a plurality of location areas to be displayed on a display, for example, bush, normal ground, and obstacles. The virtual resource object may be inserted in any location of any scene object such as bush, normal ground, or obstacles.

The terminal determines the information about the target location of the virtual resource object in the target application scene when the current location satisfies the preset condition. The target location information may be information about a current location of the virtual resource object in a scene object, or may be information about a future location of the virtual resource object in a possible scene object. In short, the target location information may be information about any location in a scene object, and is specifically related to the scene object in the target application scene, which is not specifically limited herein.

During actual application, the terminal determines the information about the target location of the virtual resource object in the target application scene based on a movement track of the virtual resource object on the operation interface. When the terminal detects that the virtual resource object stops moving, the terminal obtains a stop location of the virtual resource object on an operation interface corresponding to the target application scene. When the terminal is a mobile phone or a tablet computer, the terminal may perform the operation by using a touchscreen of the mobile phone or the tablet computer. The touchscreen herein is also referred to as a "touch panel", which is an inductive liquid crystal display apparatus that can receive signals input by a contact and the like. When a graphical button on the screen is touched, a tactile feedback system on the screen can drive various connected apparatuses by using a pre-programmed program, which can be used to replace a mechanical button layout and create vivid audio and video effects with a liquid crystal display screen. The terminal obtains the track of movement of the virtual resource object made by a finger of a user, and determines the target location information of the virtual resource object. Certainly, when the terminal is operated by using a mouse, the terminal obtains the track of movement of the virtual resource object made by the mouse of the user, and determines the target location information of the virtual resource object.

It is noted that the terminal can control operations on the virtual resource object when the virtual resource object is in a usable state, that is, in a releasable state or a non-cold-down (CD) state.

303. Generate a corresponding indicator based on the target location information, where the indicator indicates a location area feature corresponding to the target location information by using a target appearance.

A correspondence exists between a location area of the indicator and the target appearance of the indicator. That is, each scene object has a corresponding indicator. When the target location information is in a scene object, a corresponding indicator is generated. The indicator indicates a location area feature, that is, the scene object, corresponding to the target location information by using a target appearance.

In some possible implementations, the target appearance includes at least one or a combination of a color, a size, and a shape. To be specific, the location area feature corresponding to the location information may be indicated by using target appearances in a plurality of forms, for example, indicators in different colors, indicators of different shapes, indicators of different sizes, indicators of different types or the like, or indicators in different combined forms, which is not specifically limited herein.

304. Receive an instruction for inserting the virtual resource object.

The terminal provides a terminal user display interface for the user to input an insertion instruction. The terminal user display interface includes a button or an operation option corresponding to the insertion instruction. For example, the user selects the button or the operation option corresponding to the insertion instruction in a specific operation manner. The operation manner includes, but is not limited to, the user's contact or non-contact operation on or near the terminal user display interface. For example, the user uses any suitable object such as body, a hand, a finger, a stylus, or a touch glove to operate on or near the terminal user display interface. The operation includes operation types such as a single-point control operation and a multi-point control operation. The operation includes a two-dimensional operation and a three-dimensional operation. The operation includes clicking, double-clicking, sliding, swiping, touching and holding, force touch, rotating, and the like, as well as operation manners permitted by future technologies.

The virtual resource object is also referred to as a ward in a game application scene, as a tool of an own camp for providing a field of view. During actual application, the ward is limited in use time, for example, lasting 50 seconds. For example, in Strike of Kings, as war fog appears, a field-of-view tool is necessary; otherwise, it is easy to be caught in a jungle. After the ward tool is inserted, the game has higher playability, which is different from a previous mode where a trend of the entire game is determined by a team battle.

Because the game application includes a plurality of scene objects, for example, bush, normal ground, and obstacles, the ward may be inserted in any scene object such as bush, normal ground, or obstacles. For example, the ward is inserted in the bush. A player-controlled character in the bush can see a field of view outside the bush, while an enemy camp cannot see a field of view in the bush.

305. Send the target location information to a server.

After the terminal determines the target location information, the terminal adds the target location information to a frame synchronization command, and then sends the frame synchronization command to the server.

306. Receive the target location information sent by the server, where the target location information is sent by the server after the server determines that the target location passes consistency check.

After receiving the frame synchronization command sent by the terminal, the server parses the frame synchronization command to obtain the target location information, and performs consistency check on the target location information. If the target location information can pass consistency check, the server sends the target location information to the terminal.

During actual application, after the server determines that the target location information passes consistency check, the server distributes the target location information to all terminals related to the application scene, so that all the terminals update the application scene based on the target location information.

307. Insert the virtual resource object in a location area indicated by the indicator.

The terminal directly inserts the virtual resource object based on the location area indicated by the indicator. As can be seen, the indicator provides a good positioning direction for the virtual resource object. When the indicator indicates a specific location area, the virtual resource object is inserted in the corresponding location area. During actual application, the indicator indicates the location area by using an arrow or a circle or a dot or in another manner, or may indicate the location area by using different colors, different sizes, different brightness, different shapes or the like of the indicator, which is not specifically limited herein.

For example, if the indicator indicates bush, the virtual resource object is inserted in the bush. If the indicator indicates normal ground, the virtual resource object is inserted in the normal ground. If the indicator indicates an obstacle, the virtual resource object is inserted in a target area near the obstacle. A specific direction or distance exists between the target area and the obstacle, and is set in the terminal by default or set by the user or randomly set by the terminal depending on an actual scene, which is not specifically limited herein.

Figure 11:
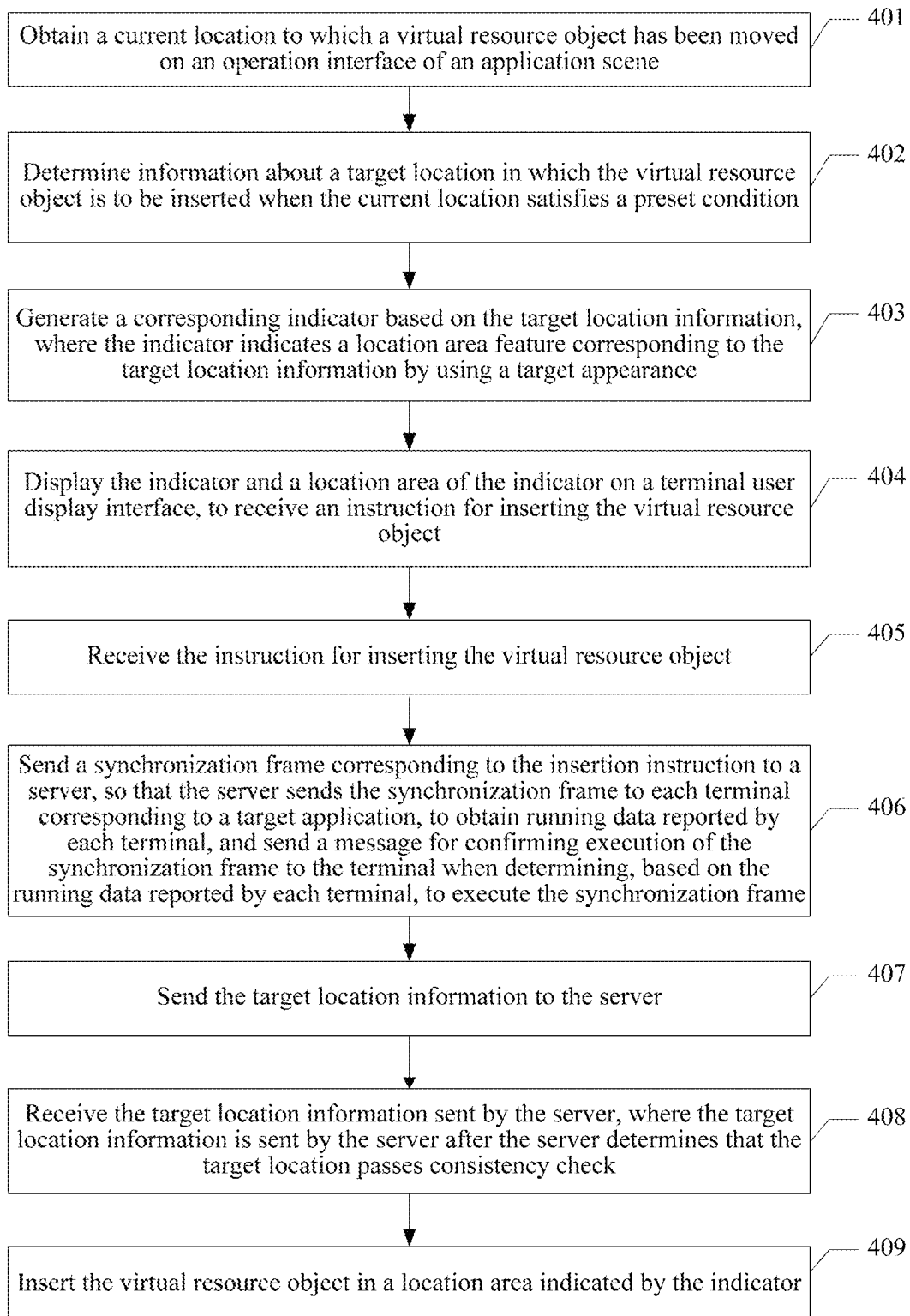
FIG. 11 is a schematic diagram of another embodiment of the method for inserting a virtual resource object in an application according to the embodiments of the present disclosure.

Referring to FIG. 11, FIG. 11 is a schematic diagram of another embodiment of the method for inserting a virtual resource object in an application according to the embodiments of the present disclosure. A specific procedure of this embodiment includes the following steps:

401. Obtain a current location to which a virtual resource object has been moved on an operation interface of an application scene.

402. Determine information about a target location in which the virtual resource object is to be inserted when the current location satisfies a preset condition.

403. Generate a corresponding indicator based on the target location information, where the indicator indicates a location area feature corresponding to the target location information by using a target appearance.

Figure 10:
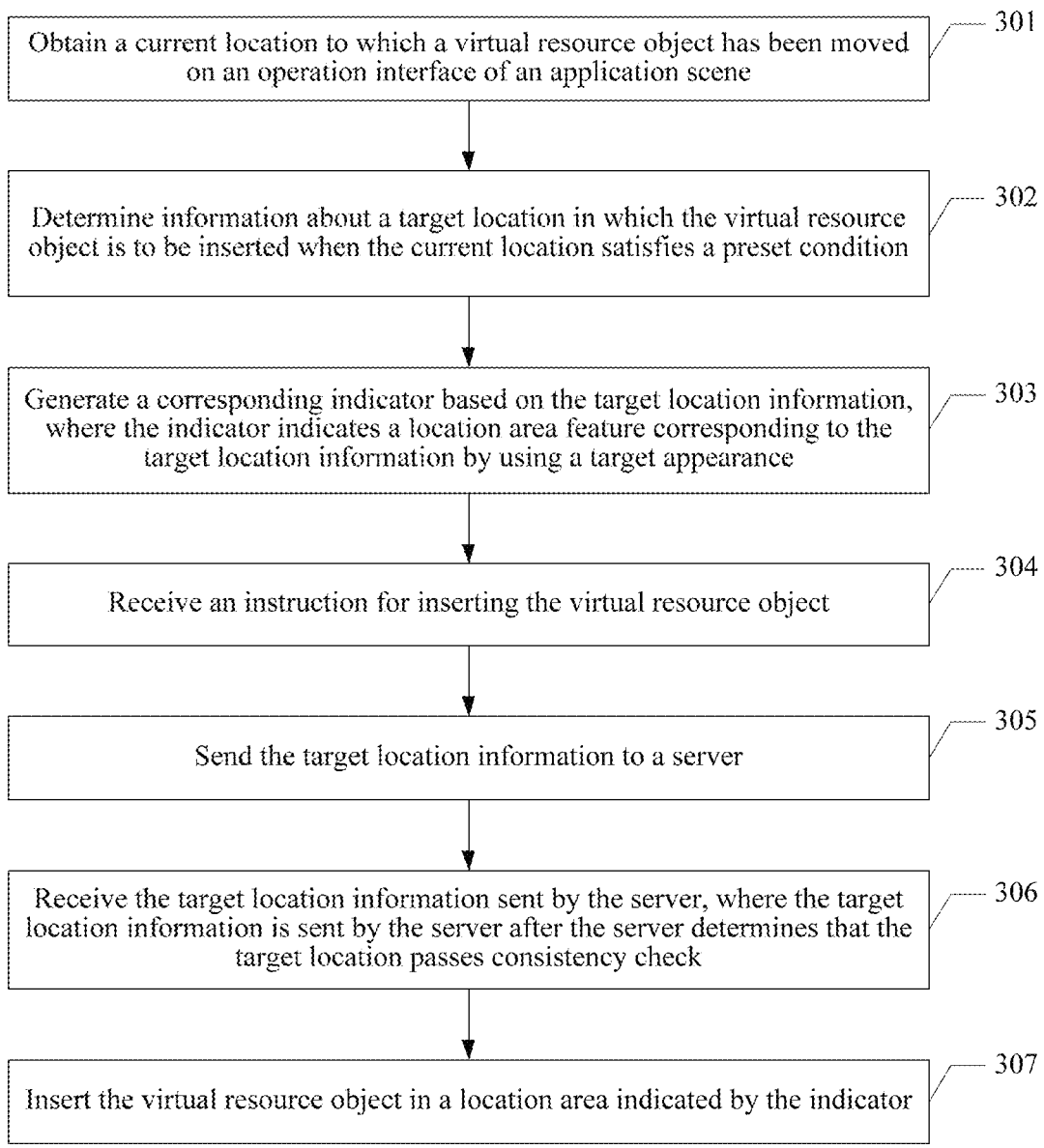
FIG. 10 is a schematic diagram of another embodiment of the method for inserting a virtual resource object in an application according to the embodiments of the present disclosure.

It is noted that step 401 to step 403 are the same as or similar to step 301 to step 303 shown in FIG. 10. For details, refer to descriptions of step 301 to step 303, which are not described herein again.

404. Display the indicator and a location area of the indicator on a terminal user display interface, to receive an instruction for inserting the virtual resource object.

In this embodiment of the present disclosure, a correspondence exists between the location area of the indicator and the target appearance of the indicator, and the target appearance includes at least one or a combination of a color, a size, and a shape.

In some possible implementations, if the target appearance includes the color, the displaying the indicator and the location area of the indicator on a terminal user display interface includes:

displaying a blue indicator and a normal ground area corresponding to the blue indicator on the terminal user display interface; or displaying a green indicator and a bush area corresponding to the green indicator on the terminal user display interface; or displaying a yellow indicator and an obstacle area corresponding to the yellow indicator on the terminal user display interface.

Figure 12:
FIG. 12 is a schematic diagram of an application scene where a virtual resource object is inserted in an application according to an embodiment of present disclosure.
Figure 13:
FIG. 13 is a schematic diagram of another scene where a virtual resource object is inserted in an application according to an embodiment of present disclosure.
Figure 14:
FIG. 14 is a schematic diagram of another scene where a virtual resource object is inserted in an application according to an embodiment of present disclosure.

As shown in FIG. 12, a blue indicator is displayed if the indicator is in a normal ground area. As shown in FIG. 13, a green indicator is displayed if the indicator is in a bush area. As shown in FIG. 14, a yellow indicator is displayed if the indicator is in an obstacle (for example, a wall) area. Based on such a manner in which different colors are displayed when the indicator moves to different scene objects, a player can be clearly notified of a place where the current virtual resource object is to be inserted, to instruct the player to perform a more precise operation. Specifically, during insertion of the virtual resource object, when the indicator is moved to the normal ground, the bush, and the obstacle, the color of the indicator is respectively changed to blue, green, and yellow. In such an indication mode, the player's judgment when the virtual resource object is inserted is greatly improved.

Certainly, during actual application, the correspondence between the location area of the indicator and the indicator is more than a correspondence in the color of the indicator, which may alternatively be a correspondence in the size of the indicator, or may be a correspondence in other decorations of the indicator, and is not specifically limited herein.

405. Receive the instruction for inserting the virtual resource object.

It is noted that step 405 is the same as or similar to step 304 shown in FIG. 10. For details, refer to descriptions of step 304, which are not described herein again.

406. Send a synchronization frame corresponding to the insertion instruction to a server, so that the server sends the synchronization frame to each terminal corresponding to a target application, to obtain running data reported by each terminal, and send a message for confirming execution of the synchronization frame to the terminal when determining, based on the running data reported by each terminal, to execute the synchronization frame.

After receiving the instruction for inserting the virtual resource object from the user, the terminal sends the synchronization frame corresponding to the insertion instruction to the server corresponding to the target application. Assuming that the application is a game application of Tencent, the corresponding server may be a Tencent game platform (TGP) server. After receiving the synchronization frame, the server sends the synchronization frame in a broadcast manner to each terminal corresponding to the target application. Each terminal performs self-check, for the purpose of preventing an application plug-in or a repeated operation of the user. A self-check process includes determining whether the location area of the virtual resource object is within a preset range, whether the user repeats an operation, or the like. For example, the user may repeat an operation in a poor network condition. Each terminal sends self-check running data to the server for summarization.

After determining, based on the running data reported by each terminal, that each terminal passes self-check, the server sends a message for confirming execution of the synchronization frame to the terminal, so that the terminal executes an instruction for releasing the virtual resource object.

407. Send the target location information to the server.

408. Receive the target location information sent by the server, where the target location information is sent by the server after the server determines that the target location passes consistency check.

409. Insert the virtual resource object in a location area indicated by the indicator.

It is noted that step 407 to step 409 are the same as or similar to step 305 to step 307 shown in FIG. 10. For details, refer to descriptions of step 305 to step 307, which are not described herein again.

As can be seen, with the indicator, the virtual resource object is inserted in the location indicated by the indicator, so that virtual resource object insertion precision is effectively improved, and a virtual resource object insertion error rate is reduced.

The foregoing describes the method for inserting a virtual resource object in an application in the embodiments of this application, and the following describes the terminal in the embodiments of this application. Specifically, referring to FIG. 15 for an embodiment of the terminal in the embodiments of this application, the terminal 500 includes:

an obtaining module 501, configured to obtain a current location to which a virtual resource object has been moved on an operation interface of an application scene;

a determining module 502, configured to determine information about a target location in which the virtual resource object is to be inserted when the current location obtained by the obtaining module satisfies a preset condition;

a sending module 503, configured to send the target location information determined by the determining module to a server;

a receiving module 504, configured to receive the target location information sent by the server, the target location information being sent by the server after the server determines that the target location passes consistency check; and a processing module 505, configured to insert the virtual resource object in the location indicated by the target location information received by the receiving module.

In this embodiment of this application, the determining module 502 determines, based on the preset condition and the current location, obtained by the obtaining module 501, of the virtual resource object on the operation interface of the game scene, the information about the target location in which the virtual resource object is to be inserted, and then the sending module 503 sends the target location information to the server. After the server determines that the target location passes consistency check, the receiving module 504 receives the target location information, and the processing module 505 inserts the virtual resource object in the location indicated by the target location information, instead of directly inserting the virtual resource object in the current location. Therefore, a user can insert a virtual resource object more accurately, and user experience is improved.

Figure 15:
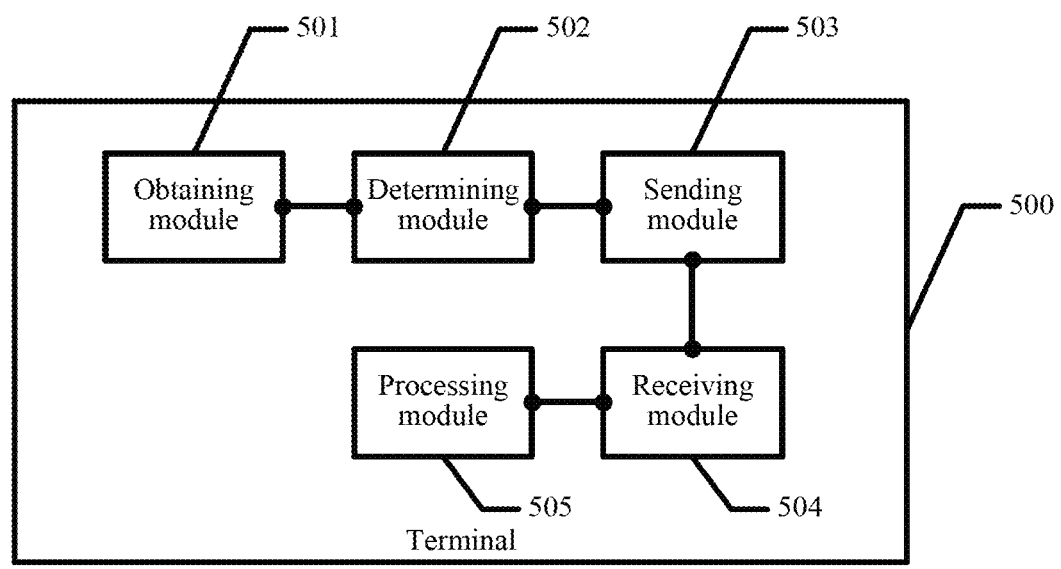
FIG. 15 is a schematic diagram of an embodiment of a terminal according to the embodiments of this application.
Figure 16:
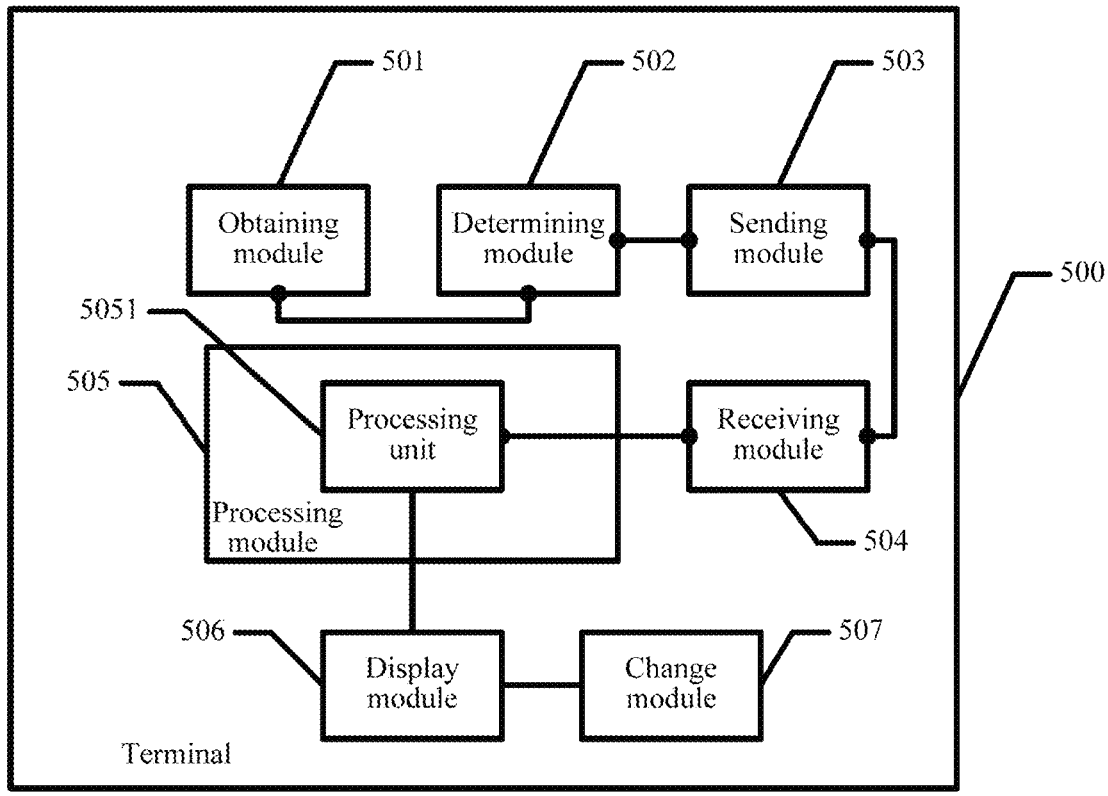
FIG. 16 is a schematic diagram of another embodiment of the terminal according to the embodiments of this application.

Based on the terminal shown in FIG. 15, optionally, as shown in FIG. 16, the terminal further includes a display module 506, configured to display an operation interface of an application scene that is updated after the virtual resource object is inserted in the location indicated by the target location information.

Based on the terminal shown in FIG. 15, optionally, as shown in FIG. 16, the terminal further includes a change module 507, configured to change a skill indicator of the virtual resource object to a target color when the current location satisfies the preset condition, where the target color is used to indicate that the virtual resource object is allowed to be inserted in the location indicated by the target location information.

Optionally, the virtual resource object is a virtual resource object in a game scene and used to monitor a field of view, and the location indicated by the target location information is in a to-be-monitored field of view. The preset condition is that the current location is in a preset determining box of the to-be-monitored field of view or the current location is in the to-be-monitored field of view, and the preset determining box is an area with a preset distance to an edge of the to-be-monitored field of view.

Optionally, based on the terminal shown in FIG. 15, optionally, the processing module 505 of the terminal shown in FIG. 16 specifically includes:

a processing unit 5051, configured to determine the target location information based on the current location from a mapping relationship, where the mapping relationship is a mapping relationship between the current location and the location indicated by the target location information.

Figure 17:
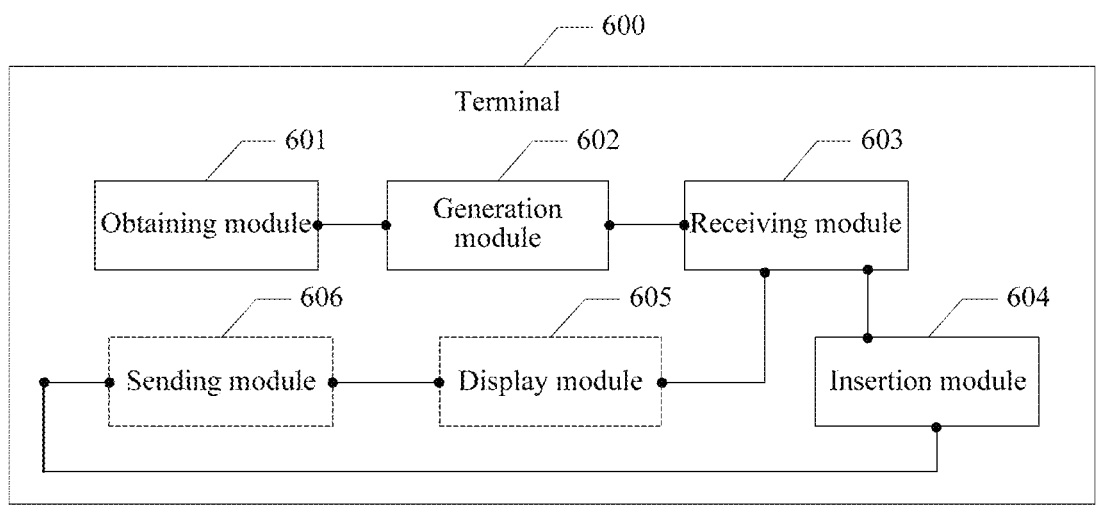
FIG. 17 is a schematic diagram of another embodiment of the terminal according to the embodiments of this application.

Referring to FIG. 17 for another schematic structural diagram of the terminal in the embodiments of the present disclosure, the terminal 600 includes:

an obtaining module 601, a generation module 602, a receiving module 603, and an insertion module 604, where the obtaining module 601 is configured to obtain information about a target location of a virtual resource object in a target application scene;

the generation module 602 is configured to generate a corresponding indicator based on the target location information, where the indicator indicates a location area feature corresponding to the target location information by using a target appearance;

the receiving module 603 is configured to receive an instruction for inserting the virtual resource object; and the insertion module 604 is configured to insert the virtual resource object in a location area indicated by the indicator.

When the indicator indicates a specific location area, the virtual resource object is inserted in the corresponding location area. During actual application, the indicator indicates the location area by using an arrow or a circle or a dot or in another manner, or may indicate the location area by using different colors, different sizes, different brightness, different shapes or the like of the indicator, which is not specifically limited herein.

In some possible implementations, the target application scene includes a plurality of location areas, for example, a normal ground area, a bush area, and an obstacle area, used to display the indicator. A correspondence exists between the location area of the indicator and the target appearance of the indicator.

Based on the terminal 600 shown in FIG. 17, optionally, the terminal 600 further includes:

a display module 605, configured to: before the insertion module 604 inserts the virtual resource object in a location area indicated by the indicator, display the indicator and the location area of the indicator on a terminal user display interface, to receive the instruction for inserting the virtual resource object.

In some possible implementations, the display module 605 is specifically configured to:

display a blue indicator if the indicator is in a normal ground area;

display a green indicator if the indicator is in a bush area; and display a yellow indicator if the indicator is in an obstacle area.

During actual application, the correspondence between the location area of the indicator and the indicator is more than a correspondence in the color of the indicator, which may alternatively be a correspondence in the size of the indicator, or may be a correspondence in other decorations of the indicator, and is not specifically limited herein.

Based on the terminal shown in FIG. 17, optionally, the terminal 600 further includes:

a sending module 606, configured to: after the display module 605 displays the indicator and the location area of the indicator on the terminal user display interface, to receive the instruction for inserting the virtual resource object, send a synchronization frame corresponding to the insertion instruction to the server, so that the server sends the synchronization frame to each terminal corresponding to a target application, to obtain running data reported by each terminal, and send a message for confirming execution of the synchronization frame to the terminal when determining, based on the running data reported by each terminal, to execute the synchronization frame.

In some possible implementations, the target appearance includes at least one or a combination of a color, a size, and a shape.

In some possible implementations, if the target appearance includes the color, the display module 605 is configured to:

display a blue indicator and a normal ground area corresponding to the blue indicator on the terminal user display interface; or display a green indicator and a bush area corresponding to the green indicator on the terminal user display interface; or display a yellow indicator and an obstacle area corresponding to the yellow indicator on the terminal user display interface.

During actual application, the correspondence between the location area of the indicator and the indicator is more than a correspondence in the color of the indicator, which may alternatively be a correspondence in the size of the indicator, or may be a correspondence in other decorations of the indicator, and is not specifically limited herein.

After the obtaining module 601 obtains the information about the target location of the virtual resource object in the target application scene, the generation module 602 generates the corresponding indicator based on the target location information, where the indicator indicates the location area feature corresponding to the target location information by using the target appearance, and after the receiving module 603 receives the instruction for inserting the virtual resource object, the insertion module 604 inserts the virtual resource object in a location area indicated by the indicator. As can be seen, with the indicator and the correspondence between the indicator and the location area feature corresponding to the target location information, virtual resource object insertion precision is effectively improved, and a virtual resource object insertion error rate is reduced.

Figure 18:
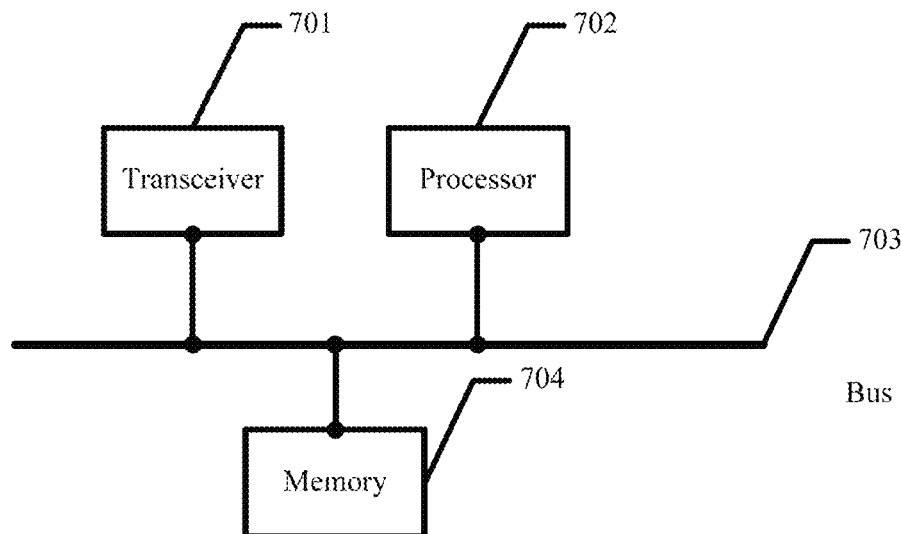
FIG. 18 is a schematic diagram of another embodiment of the terminal according to the embodiments of this application.

Specifically, referring to FIG. 18 for another embodiment of the terminal in the embodiments of this application, the terminal includes:

a transceiver 701, a processor 702, and a bus 703.

The transceiver 701 is connected to the processor 702 by using the bus 703.

The bus 703 may be a peripheral component interconnect (PCI) bus or an extended industry standard architecture (EISA) bus or the like. The bus may include an address bus, a data bus, a control bus, and the like. For ease of representation, the bus in FIG. 18 is represented by using only one bold line, but it does not mean that there is only one bus or only one type of bus.

The processor 702 may be a central processing unit (CPU), a network processor (NP), or a combination thereof.

The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Referring to FIG. 18, the terminal may further include a memory 704. The memory 704 may include a volatile memory, for example, a random-access memory (RAM), and may also include a non-volatile memory, for example, a flash memory, a hard disk drive (HDD) or a solid-state drive (SSD). The memory 704 may further include a combination of these memories.

Optionally, the memory 704 may be further configured to store a program instruction, and the processor 702 invokes the program instruction stored in the memory 704, to perform one or more steps or optional implementations in the embodiment shown in FIG. 4 or FIG. 5, to implement a terminal behavior and function in the foregoing method.

The processor 702 performs the following steps:

obtaining a current location to which a virtual resource object has been moved on an operation interface of an application scene; and determining information about a target location in which the virtual resource object is to be inserted when the current location satisfies a preset condition;

the transceiver 701 performs the following steps:

sending the target location information to a server; and receiving the target location information sent by the server, the target location information being sent by the server after the server determines that the target location passes consistency check; and the processor 702 further performs the following step:

inserting the virtual resource object in the location indicated by the target location information received by the transceiver.

Optionally, the processor 702 further performs the following step: displaying an operation interface of an application scene that is updated after the virtual resource object is inserted in the location indicated by the target location information.

Optionally, the processor 702 further performs the following step: changing a skill indicator of the virtual resource object to a target color when the current location satisfies the preset condition, where the target color is used to indicate that the virtual resource object is allowed to be inserted in the location indicated by the target location information.

In this embodiment of this application, the processor 702 determines, based on the preset condition and the current location of the virtual resource object on the operation interface of the game scene, the information about the target location in which the virtual resource object is to be inserted, and then the transceiver 701 sends the target location information to the server. After the server determines that the target location passes consistency check, the transceiver 701 receives the target location information, and the processor 702 inserts the virtual resource object in the location indicated by the target location information, instead of directly inserting the virtual resource object in the current location. Therefore, a user can insert a virtual resource object more accurately, and user experience is improved.

Figure 19:
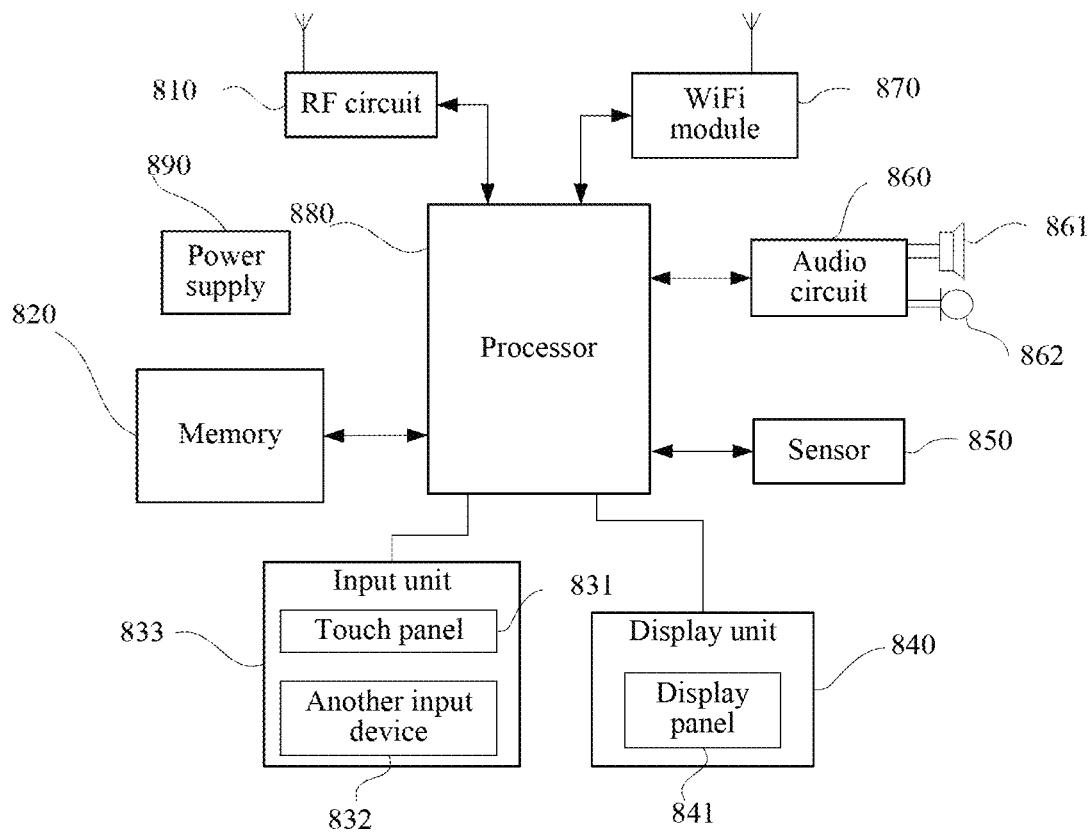
FIG. 19 is a schematic diagram of an embodiment of a mobile phone according to the embodiments of this application.

In this embodiment of this application, the terminal may be any terminal device including a mobile phone, a table computer, a personal digital assistant (PDA), a point of sales (POS), an in-vehicle computer, and the like. For example, the terminal is a mobile phone:

FIG. 19 is a block diagram of a partial structure of a mobile phone related to a terminal according to an embodiment of the present disclosure. Referring to FIG. 19, the mobile phone includes: components such as a radio frequency (RF) circuit 810, a memory 820, an input unit 830, a display unit 840, a sensor 850, an audio circuit 860, a wireless fidelity (WiFi) module 870, a processor 880, and a power supply 890. A person skilled in the art may understand that the structure of the mobile phone shown in FIG. 19 does not constitute a limitation to the mobile phone, and the mobile phone may include more or fewer components than those shown in the figure, or some components may be combined, or a different component deployment may be used.

The following specifically describes the components of the mobile phone with reference to FIG. 19:

The RF circuit 810 may be configured to receive and send signals during an information receiving and sending process or a call process. Particularly, the RF circuit 810 receives downlink information from a base station, then delivers the downlink information to the processor 880 for processing, and sends related uplink data to the base station. Generally, the RF circuit 810 includes, but is not limited to, an antenna, at least one amplifier, a transceiver, a coupler, a low noise amplifier (LNA), a duplexer, and the like. In addition, the RF circuit 810 may further communicate with a network and another device through wireless communication. The wireless communication may use any communication standard or protocol, including, but not limited to, a Global System for Mobile Communications (GSM), a General Packet Radio Service (GPRS), Code Division Multiple Access (CDMA), Wideband Code Division Multiple Access (WCDMA), Long Term Evolution (LTE), an e-mail, a Short Message Service (SMS), and the like.

The memory 820 may be configured to store a software program and module. The processor 880 runs the software program and module stored in the memory 820, to implement various functional applications of the mobile phone and data processing. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile. In addition, the memory 820 may include a high speed random access memory, and may also include a non-volatile memory, such as at least one magnetic disk storage device, a flash memory, or another volatile solid-state storage device.

The input unit 830 may be configured to receive input digit or character information, and generate a keyboard signal input related to the user setting and function control of the mobile phone. Specifically, the input unit 830 may include a touch panel 831 and another input device 832. The touch panel 831, which may also be referred to as a touchscreen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection device detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. Moreover, the touch controller can receive and execute a command sent from the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (for example, a volume control key or a switch key), a trackball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 631 transfers the touch operation to the processor 880, to determine a type of a touch event. The processor 880 then provides a corresponding visual output on the display panel 841 according to the type of the touch event. Although, in FIG. 19, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850 such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 860, a speaker 861, and a microphone 862 may provide audio interfaces between the user and the mobile phone. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

WiFi belongs to a short-range wireless transmission technology. Using the WiFi module 870, the mobile phone can help a user receive and send an e-mail, browse a webpage, access streaming media, and the like. The WiFi module provides wireless broadband Internet access for a user. Although FIG. 19 shows the WiFi module 870, it may be understood that the WiFi module is not a necessary component of the mobile phone, and when required, the WiFi module may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may be integrated with an application processor and a modem processor. The application processor mainly processes an operating system, a user interface, an application program, and the like. The modem processor mainly processes wireless communication. It may be understood that the foregoing modem may alternatively not be integrated into the processor 880.

The mobile phone further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile phone may further include a camera, a Bluetooth module, and the like, which are not further described herein.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it is understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the existing technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The storage medium includes: various media that can store program code, such as a USB flash drive, a removable hard disk, a read-only memory (ROM), a RAM, a magnetic disk, or an optical disc.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:

obtaining, by processing circuitry of a terminal device that executes an application to provide a graphical interface on a display device, a present location of a graphical symbol in the graphical interface, the graphical symbol being indicative of a placement of a resource for use in a specific area in the graphical interface;

determining, by the processing circuitry, whether the present location of the graphical symbol satisfies a preset condition for the placement of the resource in the specific area;

determining, by the processing circuitry, a target location in the specific area for disposing the resource when the present location satisfies the preset condition;

sending, by network interface circuitry of the terminal device, a request message that includes the target location to a server device via a network;

receiving, by the network interface circuitry, an approval message including the target location, the approval message being sent by the server device when the target location passes a consistency check; and updating, by the processing circuitry, the graphical interface with a graphical icon of the resource being positioned at the target location.

2. The method according to claim 1, further comprising:
changing a color of the graphical symbol to indicate that the resource is allowed to be placed in the specific area when the present location satisfies the preset condition.

3. The method according to claim 1, wherein the resource is a monitoring resource in a game graphical interface for monitoring the specific area.

4. The method according to claim 1, further comprising:
determining, by the processing circuitry, whether the present location of the graphical symbol is within a boundary of a pre-determined area that covers the specific area.

5. The method of claim 4, further comprising:
determining, by the processing circuitry, whether the present location of the graphical symbol is within the boundary that enlarges an edge of the specific area by a preset distance.

6. The method according to claim 4, further comprising:
determining the target location according to a mapping relationship between first positions in the pre-determined area and second positions in the specific area.

7. The method according to claim 6, further comprising:
selecting one of the second positions in the specific area with a shortest distance to the present location as the target location.

8. The method according to claim 1, further comprising:
adjusting the graphical symbol with a graphical appearance corresponding to characteristics of the target location when the target location is determined.

9. The method according to claim 8, further comprising:
selecting the graphical appearance from multiple graphical appearances respectively representing multiple areas in the graphical interface.

10. The method according to claim 9, further comprising:
receiving, via a user interface device, a user instruction for applying the resource at the target location.

11. The method according to claim 10, further comprising:
sending, via the network interface circuitry and in response to the user instruction, a synchronization frame to the server device to request the sever device to synchronize multiple terminal devices that have participated in the application; and receiving, via the network interface circuitry, the approval message that is sent by the server device after the server device receives testing reports from the multiple terminal devices in response to a broadcasting of the synchronization frame by the server device to the multiple terminal devices.

12. A terminal device, comprising:
network interface circuitry configured to communicate with a server device via a network;
a display device configured to display a graphical interface; and
processing circuitry configured to:
execute an application program that provides the graphical interface on the display device;
obtain a present location of a graphical symbol in the graphical interface, the graphical symbol being indicative of a placement of a resource for use at a specific area in the graphical interface;
determine whether the present location of the graphical symbol satisfies a preset condition for the placement of the resource in the specific area;
determine a target location in the specific area for disposing the resource when the present location satisfies the preset condition;
send, via the network interface circuitry, a request message that includes the target location to the server device;
receive, via the network interface circuitry, an approval message that includes the target location, the approval message being sent by the server device when the target location passes a consistency check; and
update the graphical interface with a graphical icon of the resource being positioned at the target location.

13. The terminal device according to claim 12, wherein the processing circuitry is configured to:
change a color of the graphical symbol to indicate that the resource is allowed to be placed in the specific area when the present location satisfies the preset condition.

14. The terminal device according to claim 12, wherein the processing circuitry is configured to:
determine whether the present location of the graphical symbol is within a boundary of a pre-determined area that covers the specific area.

15. The terminal device of claim 14, wherein the processing circuitry is configured to:
determine whether the present location of the graphical symbol is within the boundary that enlarges from an edge of the specific area by a preset distance.

16. The terminal device according to claim 14, wherein the processing circuitry is configured to:
determine the target location according to a mapping relationship between first positions in the pre-determined area and second positions in the specific area.

17. The terminal device according to claim 12, wherein the processing circuitry is configured to:
adjust the graphical symbol with a graphical appearance corresponding to characteristics of the target location when the target location is determined.

18. The terminal device according to claim 17, wherein the processing circuitry is configured to:
receive, via a user interface device, a user instruction for inserting the resource at the target location.

19. The terminal device according to claim 18, wherein the processing circuitry is configured to, in response to the user instruction,
send, via the network interface circuitry, a synchronization frame to the server device to request the sever device to synchronize multiple terminal devices that have participated in the application; and
receive, via the network interface circuitry, the approval message that is sent by the server device after the server device receives test reports from the multiple terminal devices in response to a broadcasting of the synchronization frame by the server device to the multiple terminal devices.

20. A non-transitory computer-readable medium storing instructions which when executed by a computer cause the computer to perform:
obtaining a present location of a graphical symbol in a graphical interface, the graphical symbol being indicative of a placement of a resource for use at a specific area in the graphical interface;

determining whether the present location of the graphical symbol satisfies a preset condition for the placement of the resource in the specific area;

determining a target location in the specific area for disposing the resource when the present location satisfies the preset condition;

sending a request message including the target location to a server device via a network;

receiving an approval message including the target location, the approval message being sent by the server device when the target location passes a consistency check; and updating the graphical interface with a graphical icon of the resource being positioned at the target location.

* * * * *